United States Patent
Ye et al.

(10) Patent No.: US 10,959,536 B2
(45) Date of Patent: Mar. 30, 2021

(54) SELECTABLE CONTROL VALVES AND INFLATABLE MATTRESS SYSTEMS COMPRISING THE SAME

(71) Applicant: Hill-Rom Services, Inc., Batesville, IN (US)

(72) Inventors: Chau Chong Ye, Singapore (SG); Yue Wang, Singapore (SG); Suresha Venkataraya, Singapore (SG)

(73) Assignee: HILL-ROM SERVICES, INC., Batesville, IN (US)

( * ) Notice: Subject to any disclaimer, the term of this patent is extended or adjusted under 35 U.S.C. 154(b) by 274 days.

(21) Appl. No.: 16/148,027

(22) Filed: Oct. 1, 2018

(65) Prior Publication Data

US 2019/0110607 A1 Apr. 18, 2019

Related U.S. Application Data

(60) Provisional application No. 62/573,298, filed on Oct. 17, 2017.

(51) Int. Cl.

| | |
|---|---|
| *F16K 31/04* | (2006.01) |
| *A47C 27/10* | (2006.01) |
| *A47C 27/08* | (2006.01) |
| *F16K 11/074* | (2006.01) |
| *F16K 3/10* | (2006.01) |

(Continued)

(52) U.S. Cl.
CPC ............ *A47C 27/10* (2013.01); *A47C 27/082* (2013.01); *A47C 27/083* (2013.01); *A61G 7/00* (2013.01); *A61G 7/05776* (2013.01); *F16K 3/10* (2013.01); *F16K 11/074* (2013.01); *F16K 31/041* (2013.01); *F16K 31/042* (2013.01);
(Continued)

(58) Field of Classification Search
CPC ..... Y10T 137/87861; Y10T 137/86863; Y10T 137/86027; Y10T 137/87877; F16K 31/041; F16K 31/042; F16K 3/10; F16K 11/074; A47C 27/10; A47C 27/082; A47C 27/083

See application file for complete search history.

(56) References Cited

U.S. PATENT DOCUMENTS

| | | | | |
|---|---|---|---|---|
| 2,548,128 | A | * | 4/1951 | Snyder .................. F16K 5/0464 251/174 |
| 3,116,757 | A | * | 1/1964 | Donguy .................. F16K 11/06 137/625.11 |

(Continued)

*Primary Examiner* — Matthew W Jellett
(74) *Attorney, Agent, or Firm* — Dinsmore & Shohl LLP

(57) ABSTRACT

Selectable control valves and mattress systems incorporating the same are disclosed. In one embodiment, an inflatable mattress system includes a pump, a selectable control valve in fluid communication with the pump, and a mattress pad having a plurality of inflatable chambers that are in fluid communication with the selectable control valve. The selectable control valve includes a valve case having an inlet port and a plurality of supply ports, a stepper motor having a motor body that is coupled to the valve case, a rotating plate having a passage and coupled to the stepper motor, and a plurality of seal cartridges positioned within the valve case. The seal cartridges each include an engagement spring and a compliant seal, where the engagement spring maintains a load on the compliant seal such that the compliant seal forms a fluid tight seal with the rotating plate.

19 Claims, 5 Drawing Sheets

(51) Int. Cl.
*A61G 7/00* (2006.01)
*A61G 7/057* (2006.01)

(52) U.S. Cl.
CPC .................. *Y10T 137/86027* (2015.04); *Y10T 137/86863* (2015.04); *Y10T 137/87861* (2015.04)

(56) References Cited

U.S. PATENT DOCUMENTS

| | | | | |
|---|---|---|---|---|
| 4,063,591 | A * | 12/1977 | Usher | F28F 3/083 165/167 |
| 4,178,963 | A * | 12/1979 | Riefler | F16K 11/074 137/624.18 |
| 4,502,507 | A * | 3/1985 | Hayman | F16K 11/074 137/625.17 |
| 4,521,309 | A * | 6/1985 | Pall | B01D 27/08 210/493.2 |
| 5,704,396 | A * | 1/1998 | Brillant | F16K 11/074 137/625.15 |
| 5,775,373 | A * | 7/1998 | Pawelzik | F16K 11/074 137/625.46 |
| 7,500,490 | B2 * | 3/2009 | Wagner | B01D 53/0446 137/312 |
| 2018/0085541 | A1 * | 3/2018 | Ye | A61M 16/024 |

* cited by examiner

SELECTABLE CONTROL VALVES AND INFLATABLE MATTRESS SYSTEMS COMPRISING THE SAME

CROSS-REFERENCE TO RELATED APPLICATIONS

The present application claims priority to U.S. Provisional Patent Application Ser. No. 62/573,298 filed Oct. 17, 2017 and entitled "Selectable Control Valves And Inflatable Mattress Systems Comprising The Same," the entirety of which is incorporated by reference herein.

TECHNICAL FIELD

The present disclosure relates to patient support devices, and, more specifically, patient support devices having selectively inflatable mattress systems to provide varying support to patients.

BACKGROUND

Decubitus ulcers, otherwise known as pressure sores or bedsores, may develop when a bed-ridden person is not able to actively reposition himself through a variety of postures. For example, people who are unconscious, unable to sense pain, paralyzed, or otherwise unable to move can remain in the same posture and position, fostering the development of the bedsores. To reduce the incidence of bedsores, caregivers need to move or rotate the bed-ridden person on a regular basis and vary the parts of the body that are exposed to pressure, thereby reducing the risk of developing bedsores. Bed sores can be found on bed-ridden patients in a variety of caregiving facilities, including hospitals, nursing homes, and in homes under home care. Bedsores can lead to additional medical complications, including bone and blood infections, infectious arthritis, and penetrating holes below the wound that burrow into bone or deeper tissues.

Bedsores generally form at points of contact between the patient's skin and the surface of a bed. The skin's blood supply is believed to be interrupted or reduced by pressure caused by the patient bearing his or her weight on these points of contact. The pressure in turn causes injury to skin cells. Unless the pressure is periodically relieved to allow full blood flow to the pressed areas of the skin, the skin cells in the area become damaged, leading to ulcerations as the body attempts to repair the damaged skin cells. The ulcerations can grow into notable bedsores.

Previous therapies have required caregivers to manually adjust the posture of the patient to change the areas of the patient's body that are in contact with the bed surface. In some cases, this has not been completed Accordingly, inflatable mattress systems, including inflatable mattress systems that include selectable control valves that control a redirection of supportive fluid, that provide for a patient's weight to be redistributed on a bed surface may be desired.

SUMMARY

In one embodiment, an inflatable mattress system includes a pump, a selectable control valve in fluid communication with the pump, and a mattress pad having a plurality of inflatable chambers that are in fluid communication with the supply ports of the selectable control valve. The selectable control valve includes a valve case having an inlet port and a plurality of supply ports, a stepper motor having a motor body that is coupled to the valve case, a rotating plate having a passage and rotationally coupled to a motor shaft of the stepper motor, and a plurality of cartridge seals positioned within the valve case. The cartridge seals each include an engagement spring and a compliant seal, where the engagement spring maintains a load on the compliant seal such that the compliant seal form a fluid tight seal with the rotating plate In another embodiment, a selectable control valve includes a valve case having an inlet port and a plurality of supply ports, a stepper motor having a motor body that is coupled to the valve case, a rotating plate having a passage and rotationally coupled to a motor shaft of the stepper motor, and a plurality of cartridge seals positioned within the valve case. The cartridge seals each include an engagement spring and a compliant seal, wherein the engagement spring maintains a load on the compliant seal such that the compliant seal forms a fluid tight seal with the rotating plate. The stepper motor selectively positions the rotating plate through a variety of positions in which the passage of the rotating plate is generally aligned with no more than one of the plurality of cartridge seals at any one time.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
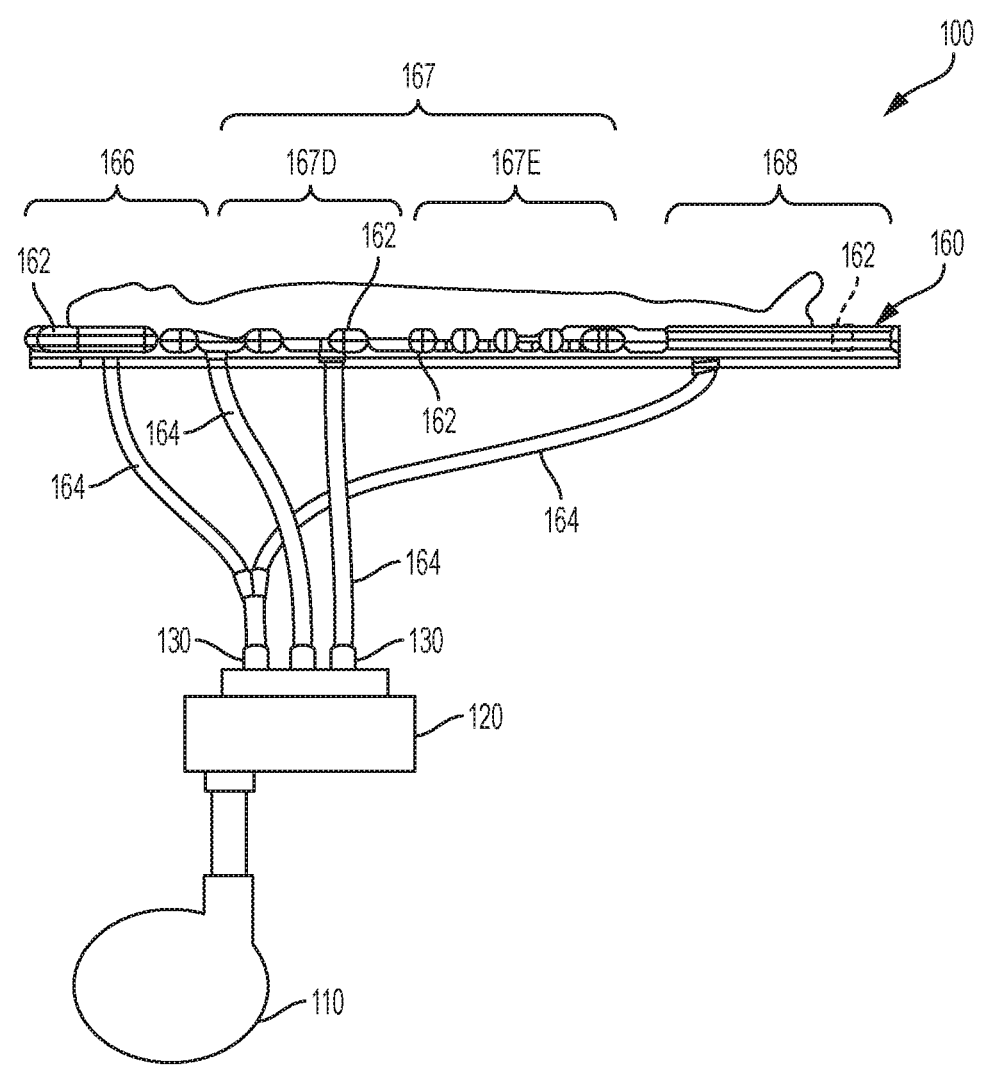
FIG. 1 is a side schematic view of an inflatable mattress system according to one or more embodiments shown or described herein.

Inflatable mattress systems for adjusting the posture of a patient are disclosed herein. These and other elements will be discussed in further detail below.

As discussed hereinabove, in caregiving settings, it may become necessary to reposition a patient through different postures such that different locations of the patient's body contacts a bed surface. Embodiments according to the present disclosure include inflatable mattress systems that allow supportive fluid to be selectively directed through a plurality of inflatable chambers that form a mattress. By selectively directing the supportive fluid into the respective plurality of inflatable chambers, the plurality of inflatable chambers can be selectively inflated or deflated, such that the plurality of inflatable chambers may selectively bear more or less, respectively, of the patient's weight. By selectively alternating which of the plurality of inflatable chambers bears more or less of the patient's weight, the corresponding region of the patient's skin may be selectively altered to bear the patient's weight. Thus, regions of high contact pressure between the patient's skin and the bed can be selectively altered to manage the time of high contact pressure at any one location on the patient's body.

In various embodiments, the inflatable mattress system can be controlled to operate in a continuous low pressure mode in which the patient's weight is distributed across the greatest surface area of the patient's skin; an alternating low pressure mode in which selected inflatable chambers are increased in pressure to increase the pressure on the patient's skin in one region, which is moved around the patient's body. In other embodiments, the inflatable mattress system may be selected to operate in a continuous lateral rotational therapy mode, in which the bed supporting the patient is rolled through up to 180 degrees of rotation; in percussion and vibration therapy in which pressure is introduced to the selected inflatable chambers at relatively high flow rates to introduce striking or vibration to the patient; and in a microclimate management mode to manage temperature and humidity of the patient's skin. Any of these modes may further reduce the development of skin breakdown of a patient, which may lead to the formation of bedsores.

Embodiments according to the present disclosure include a selectable control valve that selectively places one or more of the plurality of inflatable chambers into or out of fluid communication with a high pressure fluid source. In general, when the selectable control valve places one or more of the plurality of inflatable chambers out of fluid communication with the high pressure fluid source, the one or more of the plurality of inflatable chambers are sealed, such that fluid may be contained within the one or more plurality of inflatable chambers. Embodiments of the selectable control valve according to the present disclosure allow for control of pressure within the plurality of inflatable chambers, and for selection of the plurality of inflatable chambers to be operated through a variety of operational modes, while minimizing the continuous introduction of pressurized fluid to the plurality of inflatable chambers.

Referring now to FIG. 1, one embodiment of an inflatable mattress system 100 is depicted. The inflatable mattress system 100 includes a pump 110, a selectable control valve 120, and a mattress pad 160. The mattress pad 160 includes a plurality of inflatable chambers 162 that are positioned in an orientation to define the shape of the mattress pad 160. In general, the inflatable chambers 162 may be positioned adjacent to one another such that the plurality of inflatable chambers 162 form a mattress pad 160 having minimal interruptions between adjacent surfaces.

In some embodiments, the inflatable chambers 162 may be arranged into locations that correspond to certain anatomical positions of a patient's body. For example, various inflatable chambers 162 may be arranged in a head support region 166, a torso support region 167, and a foot and ankle support region 168. The various inflatable chambers 162 may also be arranged into various sub-regions that correspond to a patient's body. For example, the inflatable chambers 162 that are within the torso support region 167 may be grouped into a left side torso support region, a central torso support region, and a right side torso support region. Alternately, the inflatable chambers 162 that are within the torso support region 167 may be grouped into an upper torso support region 167D and a lower torso support region 167E. In various embodiments, certain inflatable chambers 162 may be placed into fluid communication with one another with a selectable manifold (not shown), such that pressurized fluid delivered to the selectable manifold is supplied to the plurality of inflatable chambers 162 that are plumbed to one another through the selectable manifold. While not depicted for the other inflatable chamber 162, other such sub-regions across the mattress pad 160 are envisioned.

The inflatable chambers 162 may each include a supply line 164 that is in fluid communication with one of the respective inflatable chambers 162. The supply lines 164 may be led away from the mattress pad 160 and towards a selectable control valve 120. Each of the supply lines 164 may be placed into fluid communication with supply ports 130 of the selectable control valve 120. The selectable control valve 120 is in fluid communication with the pump 110. As will be described below, the selectable control valve 120 may selectively place the pump 110 in fluid communication with the various supply ports 130, thereby placing the pump 110 in fluid communication with the various inflatable chambers 162 of the mattress pad 160.

Figure 2:
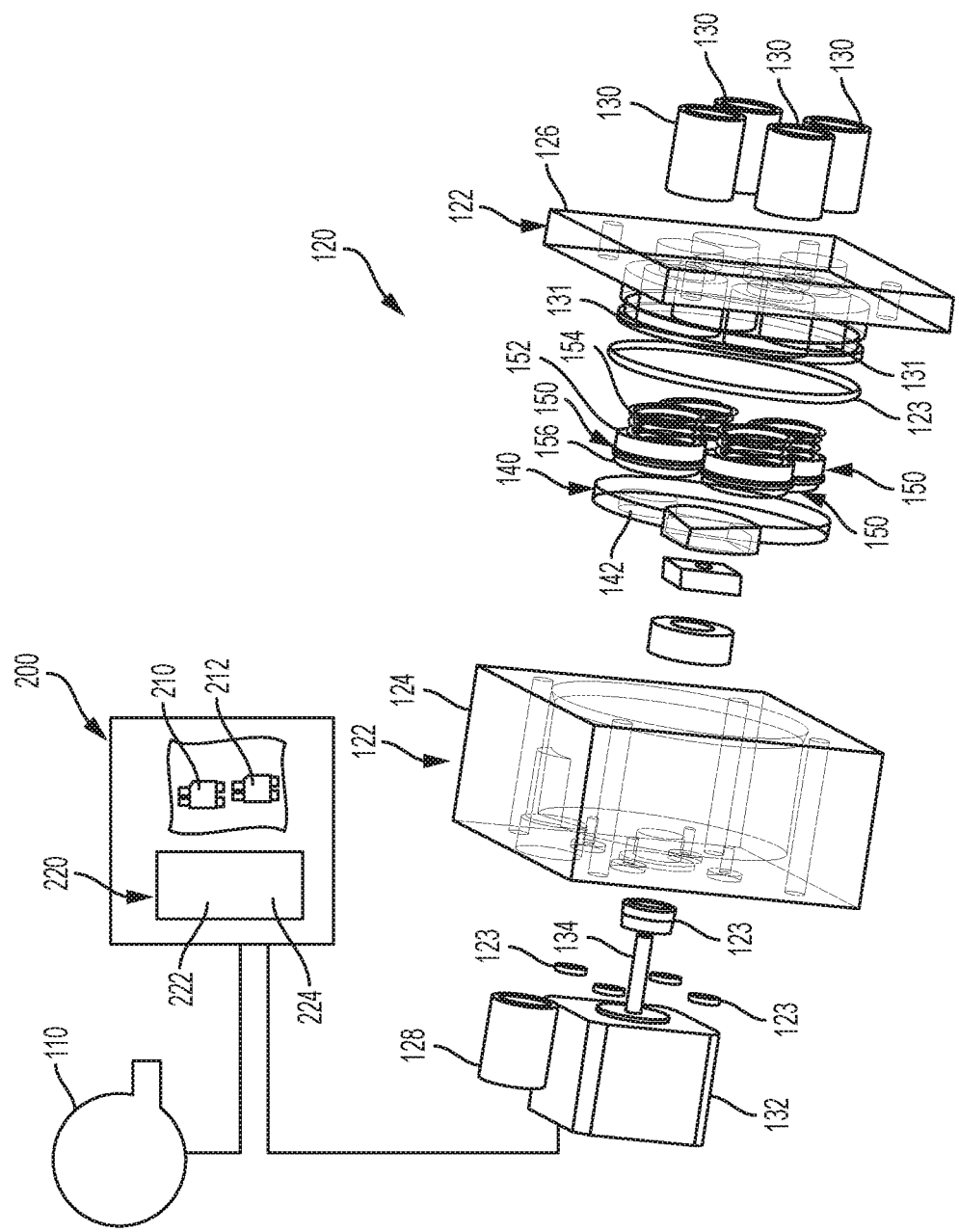
FIG. 2 is an exploded side schematic view of a pump and a selectable control valve according to one or more embodiments shown or described herein.

Referring now to FIG. 2, one embodiment of the selectable control valve 120 is shown in an exploded state to better depict the internal components of the selectable control valve 120. The selectable control valve 120 includes a valve case 122 having a case body 124 and a case lid 126. In the depicted embodiment, the case body 124 includes an inlet port 128 through which fluid enters the valve case 122. The case lid 126 includes a plurality of supply ports 130 through which fluid leaves the valve case 122. In the depicted embodiment, the case lid 126 includes four supply ports 130, however, for the purposes of this application, the number of supply ports is intended to be illustrative and not limiting to the scope of the disclosure.

The selectable control valve 120 further includes a stepper motor 132 that, in the depicted embodiment, is positioned outside of the valve case 122. The stepper motor 132 has a stepper motor shaft 134 that protrudes from an end of the stepper motor 132. The stepper motor shaft 134 is engaged with a rotating plate 140. The rotating plate 140 includes a passage 142 through which fluid can pass. The stepper motor shaft 134 of the stepper motor 132 is coupled to the rotating plate 140. The stepper motor 132 is adapted to rotate the rotating plate 140 through a variety of positions, and maintain the rotating plate 140 through a variety of indexed positions. In various embodiments, the stepper motor 132 is adapted to maintain the rotational orientation of the rotating plate 140 in various positions in which the passage 142 of the rotating plate 140 is generally co-axial with one of the plurality of supply ports 130. As depicted, the passage 142 exhibits a diametric size relative to the seal cartridges 150 such that the passage 142 is aligned with no more than one of the plurality of cartridge seals at any one time. The rotating plate 140, therefore, places no more than one of the supply ports 130 into fluid communication with the inlet port 128 at any one time. In various embodiments, the rotating plate 140 may be positioned such that none of the supply ports 130 is in fluid communication with the inlet port 128 at any one time.

The rotating plate 140 abuts against a plurality of seal cartridges 150. In the depicted embodiment, the seal cartridges 150 include a cartridge body 152, an engagement spring 154 that is attached to the cartridge body 152, and a compliant seal 156. In the depicted embodiment, the seal cartridges 150 have a generally annular shape. The cartridge body 152 and the compliant seal 156 both exhibit this annular shape, with a generally circular outer diameter and a generally circular inner diameter. This configuration allows the seal cartridges to be positioned within a generally cylindrical counterbore 131, and allows fluid to flow through the inner diameters of the components of the seal cartridge 150.

When the selectable control valve 120 is assembled, each of the plurality of seal cartridges 150 is positioned within a counterbore 131 of the case lid 126 that is generally axially aligned with one of the respective supply ports 130. Each of the plurality of seal cartridges 150 may be at least partially positioned within a respective counterbore 131. The engagement spring 154 may be partially deformed such that the seal cartridges 150 are pressed into engagement with the rotating plate 140. The engagement spring 154 may have sufficient stiffness and be deformed such that the engagement spring 154 maintains a load on the rotating plate 140 such that the compliant seal 156 forms a fluid-tight seal with the rotating plate 140.

In operation, the case lid 126 and the case body 124 may be sealed to one another such that an interior volume of the valve case 122 is fluid tight. The selectable control valve 120 may include a variety of seals 123, including seals between the case body 124 and the stepper motor shaft 134 to prevent pressurized fluid from leaking from the interior volume of the valve case. Instead, the flow of pressurized fluid that is introduced to the selectable control valve 120 is controlled by operation of the rotating plate 140 relative to the seal cartridges 150. For example, when the selectable control valve 120 is selected such that the passage 142 of the rotating plate 140 is generally aligned with one of the plurality of seal cartridges 150, pressurized fluid is permitted to flow through the inlet port 128, through the co-aligned passage 142 and the seal cartridge 150, and out of the respective supply port 130. When the selectable control valve 120 is selected such that the passage 142 of the rotating plate 140 is not generally aligned with one of the plurality of seal cartridges 150, pressurized fluid is generally prevented from flowing through the inlet port 128 and the supply ports 130. Accordingly, when the selectable control valve 120 is selected such that the passage 142 of the rotating plate 140 is not generally aligned with one of the plurality of seal cartridges 150, pressurized fluid is maintained in the supply ports 130, the respective supply lines, and the respective inflatable chambers of the mattress pad, as shown in FIG. 1. Thus, the mattress pad may be maintained in an inflated or partially inflated configuration without additional pressurized fluid being introduced to the mattress pad from the pump.

Operation of the mattress system may be controlled by operation of the pump 110 and the selectable control valve 120. In various embodiments, the pump 110 and the selectable control valve 120 may be placed in electronic communication with an electronic controller 200 having a processor 210 and a memory 212. The electronic controller 200 may include an input device 222 that allows a user to input instructions to the electronic controller 200 to control operation of the mattress system. The electronic controller 200 may also include an output device 224 that allows a user to evaluate the operating condition of the mattress system. In various embodiments, the input device 222 and the output device 224 may be incorporated into a single control component 220, for example, a liquid crystal display that incorporates a touch screen. The control component 220 may allow a user to simultaneous change operation of the mattress system and confirm mattress system operation.

The memory 212 may store a computer readable instruction set that defines operation of the mattress system. When executed by the processor, the computer readable instruction set commands the processor to provide commands to, in various embodiments, the pump 110 to provide a pre-selected pressurized fluid and the stepper motor 132 to move the rotating plate 140 between pre-determined rotational positions or to maintain the position of the rotating plate 140. The mattress system may be selected to operate through a variety of modes, including a continuous low pressure mode, an alternating pressure mode, a percussion and vibration mode, a continuous lateral rotational therapy mode, or a microclimate management mode, as discussed hereinabove. The pressure of the pressurized fluid supplied by the pump 110 to the selectable control valve 120 and the direction of pressurized fluid through the selectable control valve 120 and into the various inflatable chambers of the mattress pad may therefore provide the desired therapeutic mode to the mattress pad as so selected by the caregiver, thereby providing the desired therapeutic effects.

In various embodiments, the electronic controller 200 may control the pump 110 to control the pressure and direction of fluid flow into the selectable control valve 120. For example, when the mattress system is selected to operate in a percussion and vibration mode, the electronic controller 200 may alternate the direction of pressurized fluid flow into the selectable control valve 120, such that the desired percussion and vibration can be delivered to the patient who is positioned on the mattress pad. When the mattress system is selected to operate in a continuous low pressure mode, the electronic controller 200 may control the pump 110 to provide pressurized fluid to the selectable control valve 120 at a pressure that corresponds to maintaining inflation of the inflatable chambers of the mattress pad while minimizing a high pressure condition within the inflatable chambers that may cause points of elevated pressure between the patient's skin and the inflatable chambers. When the mattress system is selected to operate in a microclimate management mode, the electronic controller 200 may control the pump 110 to supply the selectable control valve 120 with pressurized fluid at a desired flow rate that corresponds to the desired flow rate of fluid through the mattress pad that is determined to manage temperature and humidity of the patient's skin.

Figure 3:
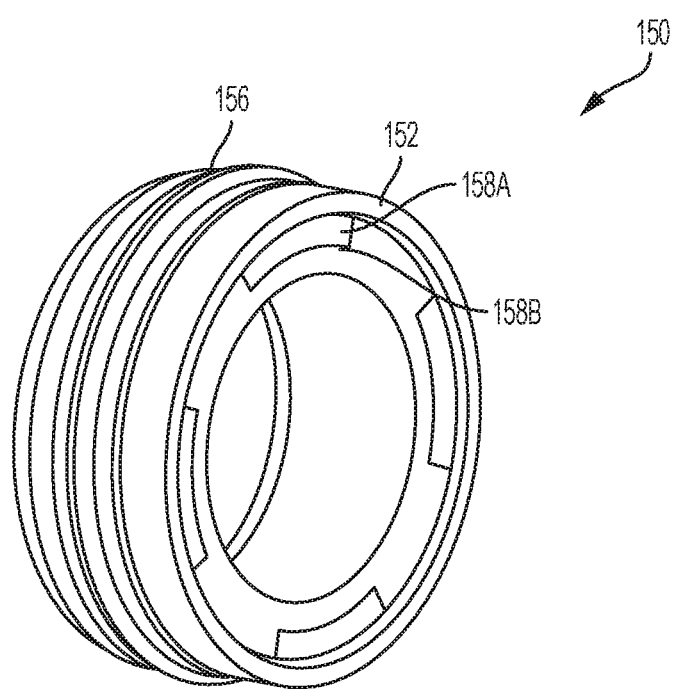
FIG. 3 is a side perspective view of a cartridge seal according to one or more embodiments shown or described herein.
Figure 4:
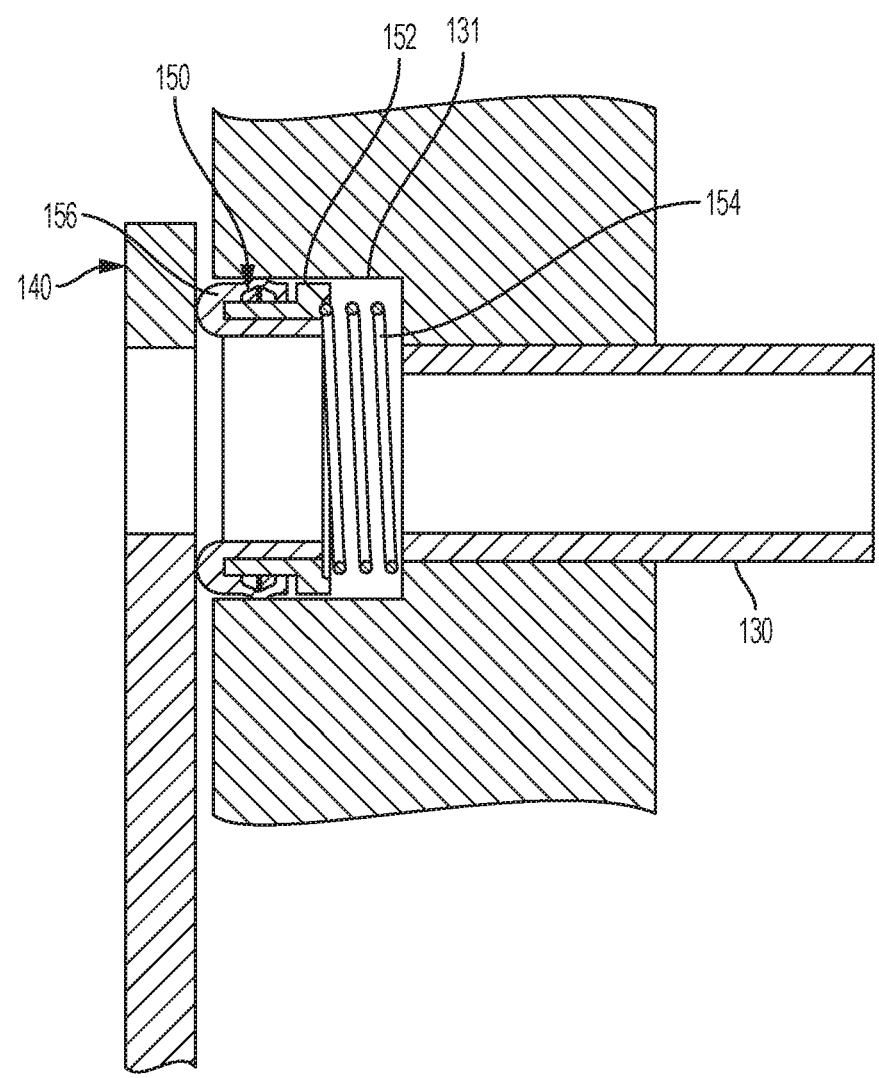
FIG. 4 is a detailed side sectional view of a selectable control valve according to one or more embodiments shown or described herein.

Referring now to FIGS. 3 and 4, components of the selectable control valve 120 are shown in greater detail. A portion of a seal cartridge 150 is depicted in FIG. 3. In the depicted embodiment, the cartridge body 152 and the compliant seal 156 of the seal cartridges 150 each exhibit corresponding castellated interfaces 158A, 158B. The castellated interface 158A, 158B provides a low-profile and resilient interface that allows the cartridge body 152 and the compliant seal 156 to be engaged with one another, such that ordinary application of force that are experienced during operation do not separate the compliant seal 156 from the cartridge body 152.

Referring to FIG. 4, in the depicted embodiment, the engagement spring 154 of the seal cartridges 150 is selected such that the outer diameter of the engagement spring 154 is smaller than the counterbore 131 of the case lid 126 and the inner diameter of the engagement spring 154 is larger than the inner diameter of the cartridge body 152 and the compliant seal 156. This sizing of the engagement spring 154 minimizes any adverse effect that the engagement spring may have on the flow rate of pressurized fluid through the selectable control valve 120.

In the depicted embodiment, the seal cartridge 150 is positioned to be at least partially within the counterbore 131 of the case lid 126. The counterbore 131 and the compliant seal 156 of the seal cartridge 150 are diametrically sized such that the compliant seal 156 is at least partially deformed by the counterbore 131. This respective diametric sizing between the compliant seal 156 and the counterbore 131 allows the compliant seal to form a fluid-tight seal with the counterbore 131. Further, as discussed hereinabove, the engagement spring 154 has sufficient stiffness and is sized to be deformed such that the engagement spring 154 maintains at least a partial deformation of the compliant seal 156 to form a fluid-tight seal with the rotating plate 140. As such, during operation, the compliant seal 156 prevents fluid from back flowing from the respective inflatable chamber of the mattress pad and into the selectable control valve 120.

In various embodiments, the counterbore 131 may provide alignment to the seal cartridge 150, such that the seal cartridge 150 is limited to movement in a direction corresponding to the centerline axis of the counterbore 131. The counterbore 131, therefore, may prevent the seal cartridge 150 from becoming inclined relative to the centerline axis of the counterbore 131. Misalignment such as an incline between the seal cartridge 150 and the centerline axis of the counterbore 131 may prevent the compliant seal 156 from maintaining even contact with the rotating plate 140 around the entire face of the compliant seal 156, which would thereby prevent the compliant seal 156 from forming a reliable seal with the rotating plate 140. In various embodiments, the relative sizing between the counterbore 131 and the cartridge body 152 may limit the axial misalignment between the counterbore 131 and the seal cartridge 150. The degree of misalignment between the counterbore 131 and the seal cartridge 150 may be limited by the diametric fit between the counterbore 131 and the cartridge body 152 and the length of the cartridge body 152 that comes into contact with the counterbore 131.

The configuration of the compliant seal 156 along the surface that contacts the rotating plate 140 may be selected such that the compliant seal 156 continues to form a seal with the rotating plate 140 beyond a condition of maximum misalignment between the counterbore 131 and the cartridge body 152. This may be accomplished, for example, by incorporating a compliant seal 156 that forms a planar seal with a degree of misalignment greater than the maximum misalignment between the counterbore 131 and the cartridge body 152, for example, by incorporating a design of the compliant seal 156 that includes a highly compliant surface that contacts the rotating plate 140.

In various embodiments, the cartridge body 152 may be made from a material that exhibits greater stiffness than the compliant seal 156. In various embodiments, the cartridge body 152 may be made from a plastic, for example, polypropylene, polystyrene, PTFE, nylon, or the like. The compliant seal 156 may be made from a material having desired properties of compliance, toughness, and recovery rate, and may include various elastomeric materials, for example, Viton, neoprene, or EPDM. In some embodiments, portions of the compliant seal 156 may have open interior cross-sections, thereby providing the compliant seal 156 with a low-rigidity cross section. Such a low-rigidity cross section may allow for sealing while maintaining a fluid-tight seal with contacting surfaces of the counterbores 131 or the rotating plate 140.

Figure 5:
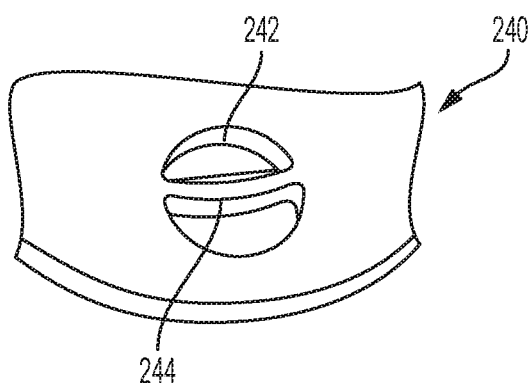
FIG. 5 is a front view of a rotating plate according to one or more embodiments shown or described herein.

Referring to FIG. 5, one embodiment of a rotating plate 240 is depicted. In the depicted embodiment, the rotating plate 240 includes a passage interior bar 244 that extends across at least a portion of the diameter of the passage 242. In the depicted embodiment, the passage interior bar 244 extends continuously across a portion of the diameter of the passage 242. The passage interior bar 244 limits intrusion of the compliant seal 156 of the corresponding seal cartridges 150 at periods of time during which the rotating plate 240 is being rotated between selected angular orientations. The passage interior bar 244 may prevent seal herniation of the compliant seal 156, while maintaining sufficient cross-sectional area of the passage 242 within the rotating plate 240 such that the flow rate of pressurized fluid through the selectable control valve is not choked.

Figure 6:
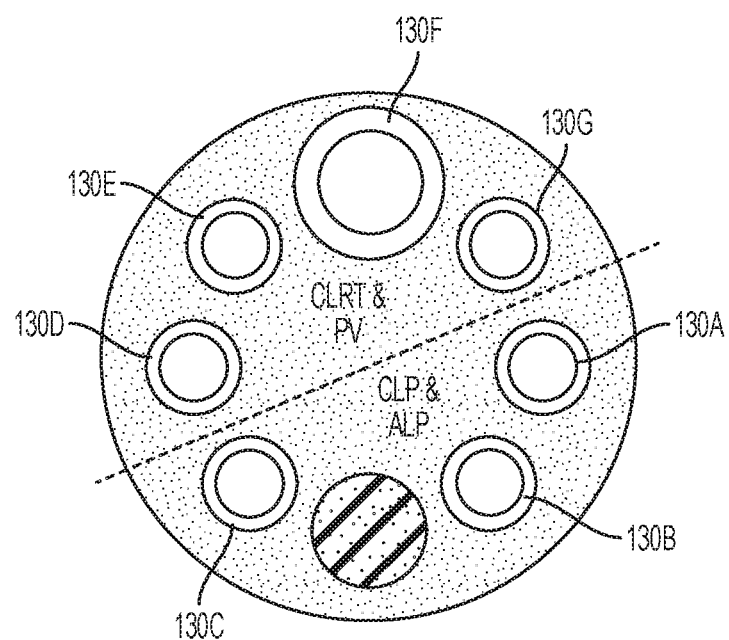
FIG. 6 is a front schematic view of a case lid for a selectable control valve according to one or more embodiments shown or described herein.

Referring now to FIG. 6, a schematic embodiment of a case lid 326 having seven supply ports 130 is depicted. In this embodiment, the case lid 326 includes supply ports 130 that are grouped according to their operation, such that a rotating plate 140 having a single passage 142 may actuate a plurality of operating modes. For example, when the mattress system is operated in a continuous low pressure mode or an alternating low pressure mode, supply ports 130A, 130B, 130C, which correspond to inflatable chambers positioned at the patient's head and feet, upper torso region, and lower torso region, respectively, may be placed in fluid communication with the pump through alignment of the rotating plate 140. When the mattress system is operated in a percussion and vibration mode, supply port 130F may be placed in fluid communication with the pump through alignment of the rotating plate 140. When the mattress system is operated in a microclimate management mode, supply port 130D may be placed in fluid communication with the pump through alignment of the rotating plate. When the mattress system is operated in a continuous lateral rotation mode, supply port 130E and 130G may be placed in fluid communication with the pump through alignment of the rotating plate. In configurations in which pressurized fluid is delivered through supply ports 130D-130G, multiple inflatable chambers may be placed in fluid communication with one another through an external manifold such that pressurized fluid can be delivered along all or substantially all of the area of the mattress pad.

It should now be understood that mattress systems according to the present disclosure include selectable control valves that allow for the distribution of pressurized fluid from a single high pressure source to a plurality of inflatable chambers that make up a mattress pad. The selectable control valves include a rotating plate having a passage that is selectively aligned with cartridge seals. The cartridge seals are positioned to contact the rotating plate, and have compliant seals that deform to form seals with the rotating plate. When the passage of the rotating seal is aligned with a cartridge seal, pressurized fluid is permitted to flow through the cartridge seal. When the passage of the rotating seal is not aligned with a cartridge seal, the cartridge seal prevents fluid from flowing through the cartridge seal, and thereby prevents fluid from flowing through a respective supply port of the selectable control valve.

It is noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. An inflatable mattress system, comprising:
   a pump;
   a selectable control valve in fluid communication with the pump and comprising:
      a valve case having an inlet port and a plurality of supply ports;
      a stepper motor having a motor body that is coupled to the valve case;
      a rotating plate rotationally coupled to a motor shaft of the stepper motor, the rotating plate comprising a passage; and
      a plurality of seal cartridges positioned within the valve case, each seal cartridge of the plurality of seal cartridges each comprising a cartridge body, an engagement spring coupled to a first end of the cartridge body, and a compliant seal encircling an opposite second end of the cartridge body and extending along an entire axial interior surface of the cartridge body, wherein the engagement spring maintains a load on the compliant seal such that the compliant seal forms a fluid tight seal with the rotating plate; and
   a mattress pad having a plurality of inflatable chambers that are in fluid communication with the plurality of supply ports of the selectable control valve.

2. The inflatable mattress system of claim 1, further comprising an electronic controller in electronic communication with the pump and the selectable control valve.

3. The inflatable mattress system of claim 2, wherein the electronic controller comprises a processor and a memory storing a computer readable instruction set that, when processed by the processor, operates the inflatable mattress system through a plurality of operational modes by controlling operation of the pump and of the selectable control valve.

4. The inflatable mattress system of claim 1, wherein the stepper motor selectively positions the rotating plate through a variety of positions in which the passage of the rotating plate is generally aligned with no more than one of the plurality of seal cartridges at any one time, thereby allowing fluid flow into a respective inflatable chamber of the mattress pad.

5. The inflatable mattress system of claim 1, wherein the valve case comprises a plurality of counterbores each aligned with a supply port, wherein each seal cartridge of the plurality of seal cartridges are at least partially positioned within a respective counterbore.

6. The inflatable mattress system of claim 1, wherein:
   the compliant seal maintains a planar seal with the rotating plate during a maximum misalignment between the counterbore and the cartridge body.

7. The inflatable mattress system of claim 6, wherein the cartridge body exhibits a stiffness greater than the compliant seal.

8. The inflatable mattress system of claim 1, wherein the cartridge body is coupled to the compliant seal at a castellated interface.

9. The inflatable mattress system of claim 1, wherein the rotating plate comprises a passage interior bar that extends across at least a portion of a diameter of the passage.

10. The inflatable mattress system of claim 9, wherein the passage interior bar extends continuously across at least a portion of the diameter of the passage.

11. The inflatable mattress system of claim 1, wherein the rotating plate is selectively positionable such that none of the plurality of supply ports are in fluid communication with the inlet port.

12. A selectable control valve comprising:
   a valve case having an inlet port and a plurality of supply ports;
   a stepper motor having a motor body that is coupled to the valve case;
   a rotating plate rotationally coupled to a motor shaft of the stepper motor, the rotating plate comprising a passage; and
   a plurality of seal cartridges positioned within the valve case, each seal cartridge of the plurality of seal cartridges comprising a cartridge body, an engagement spring coupled to a first end of the cartridge body, and a compliant seal encircling an opposite second end of the cartridge body and extending along an entire axial interior surface of the cartridge body, wherein the engagement spring maintains a load on the compliant seal such that the compliant seal forms a fluid tight seal with the rotating plate,
   wherein the stepper motor selectively positions the rotating plate through a variety of positions in which the passage of the rotating plate is aligned with no more than one of the plurality of seal cartridges at any one time.

13. The selectable control valve of claim 12, wherein the valve case comprises a plurality of counterbores each aligned with a supply port, wherein each seal cartridge of the plurality of seal cartridges are at least partially positioned within a respective counterbore.

14. The selectable control valve of claim 13, wherein each of the compliant seals of each seal cartridge of the plurality of seal cartridges is deformed in a diametric dimension by the respective counterbore.

15. The selectable control valve of claim 13, wherein:
   the compliant seal maintains a planar seal with the rotating plate during a maximum misalignment between the counterbore and the cartridge body.

16. The selectable control valve of claim 15, wherein the cartridge body exhibits a stiffness greater than the compliant seal.

17. The selectable control valve of claim 12, wherein the cartridge body is coupled to the compliant seal at a castellated interface.

18. The selectable control valve of claim 12, wherein the rotating plate comprises a passage interior bar that extends across at least a portion of a diameter of the passage.

19. The selectable control valve of claim 18, wherein the passage interior bar extends continuously across at least a portion of the diameter of the passage.

\* \* \* \* \*